(12) United States Patent
Balslink et al.

(10) Patent No.: US 9,651,377 B2
(45) Date of Patent: May 16, 2017

(54) YAW RATE SENSOR HAVING THREE SENSITIVE AXES AND METHOD FOR MANUFACTURING A YAW RATE SENSOR

(71) Applicant: Robert Bosch GmbH, Stuttgart (DE)

(72) Inventors: Thorsten Balslink, Kirchentellinsfurt (DE); Hendrik Specht, Pliezhausen (DE); Johannes Classen, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 159 days.

(21) Appl. No.: 14/313,428

(22) Filed: Jun. 24, 2014

(65) Prior Publication Data
US 2014/0373628 A1 Dec. 25, 2014

(30) Foreign Application Priority Data
Jun. 25, 2013 (DE) .................. 10 2013 212 112

(51) Int. Cl.
*G01C 19/5769* (2012.01)
*G01C 19/5747* (2012.01)
*G01C 19/5712* (2012.01)

(52) U.S. Cl.
CPC ..... *G01C 19/5769* (2013.01); *G01C 19/5712* (2013.01); *G01C 19/5747* (2013.01); *Y10T 29/49117* (2015.01)

(58) Field of Classification Search
CPC .................. G01C 19/5712; G01C 19/574
See application file for complete search history.

(56) References Cited

U.S. PATENT DOCUMENTS

| 9,194,704 B2* | 11/2015 | Lin ................... G01C 19/5747 |
| 2011/0154898 A1* | 6/2011 | Cazzaniga ......... G01C 19/5747 73/504.12 |
| 2012/0291548 A1* | 11/2012 | Kanemoto ........... G01C 19/574 73/504.12 |

* cited by examiner

*Primary Examiner* — Daniel J Colilla
(74) *Attorney, Agent, or Firm* — Gerard Messina

(57) ABSTRACT

A yaw rate sensor includes: a first sensor structure having a first oscillating mass and configured to detect a first yaw rate around a first axis of rotation; a second sensor structure having a second oscillating mass and configured to detect second and third yaw rates around second and third axes of rotation, respectively; and a drive structure coupled to the first and second oscillating masses. The first oscillating mass is drivable into a first drive oscillation along a first oscillation direction, and the second oscillating mass is drivable into a second drive oscillation along a second oscillation direction different from the first oscillation direction. The first axis of rotation is perpendicular to the first oscillation direction, and the second and third axes of rotation are perpendicular to the second oscillation direction.

22 Claims, 8 Drawing Sheets

YAW RATE SENSOR HAVING THREE SENSITIVE AXES AND METHOD FOR MANUFACTURING A YAW RATE SENSOR

BACKGROUND OF THE INVENTION

1. Field of the Invention

The present invention is directed to a yaw rate sensor having multiple sensitive axes.

2. Description of the Related Art

Such yaw rate sensors having multiple sensitive axes are generally known. For example, in the case of conventional yaw rate sensors having three sensitive axes, in each case three separate sensor structures, each having one sensitive axis, are arranged on a shared substrate. Due to the arrangement of the sensor structures adjacent to one another along a projection direction perpendicular to the substrate main extension plane, such yaw rate sensors have a comparatively large structural form, whereby an increased surface area requirement results. Limits are placed on the reduction of the structural space of the yaw rate sensor in that in the event of a reduction in size of the sensor structures, certain requirements for the drive frequencies, the sensor sensitivities, and/or manufacturing tolerances may not be maintained or may only be maintained with a large expenditure.

BRIEF SUMMARY OF THE INVENTION

The yaw rate sensor according to the present invention and the method according to the present invention for manufacturing a yaw rate sensor have the advantage over the related art that a yaw rate sensor having three sensitive axes and a very compact structural form is provided. A yaw rate sensor having three sensitive axes is also referred to here as a three-channel or three-axis yaw rate sensor.

At the same time, the yaw rate sensor is configured in such a way that the first oscillating mass and the second oscillating mass may be driven into coupled drive oscillations or drive modes and the second yaw rate and the third yaw rate around different axes of rotation are detectable with the aid of the same oscillating mass by the second sensor structure. In particular, the first or second sensor structure has a deflection means, whereby the drive movement of the drive structure along one drive direction is converted into the drive oscillation of the first or second oscillating mass along the first or second oscillation direction, respectively. In this case, the oscillation direction is situated perpendicularly to the drive direction in particular.

The yaw rate sensor according to the present invention having three sensitive axes is based on the Coriolis principle and may be used, for example, in the automotive field and/or the consumer electronics field, due to the small structural size and simple structural form, a comparatively cost-effective yaw rate sensor being provided, which is usable in a comparatively versatile way. Furthermore, due to the compact coupled construction in comparison to three individual sensors, a simpler analysis circuit may be situated in the yaw rate sensor.

It is advantageously possible in particular by way of the yaw rate sensor according to the present invention to provide, with the aid of a shared drive movement of the drive structure, a drive of the oscillating masses to detect a yaw rate around each axis of rotation in each case. Using the conventional yaw rate sensors only having a simple linear movement, for example, rotational movements may only be detected around two axes. In particular, a special form of the coupling between drive structure and oscillating masses is provided here, a deflection element or deflection frame, which encloses the first oscillating mass and/or the second oscillating mass, being situated, which converts a drive movement of the drive structure into the first drive oscillation along the first oscillation direction and/or into the second drive oscillation along the second oscillation direction.

In particular, the drive structure is a drive frame and/or a drive bar, in particular a web-shaped drive bar. The first oscillating mass includes in particular two first partial oscillating masses, which are drivable in phase opposition to one another, and which are configured to detect a yaw rate around the first axis of rotation. The second oscillating mass particularly preferably includes a second partial oscillating mass and a further second partial oscillating mass, which are drivable in phase opposition, each of the two second partial oscillating masses detecting, in particular simultaneously, a second yaw rate around the second axis of rotation and a third yaw rate around the third axis of rotation.

According to one preferred refinement, it is provided that the first oscillating mass is coupled via a first deflection element to the drive structure and/or the second oscillating mass is coupled via a second deflection element to the drive structure, the first deflection element and/or the second deflection element in particular is/are being configured in such a way that the first oscillation direction is situated perpendicularly to the second oscillation direction. According to another preferred refinement, it is provided that the first deflection element is a first frame which encloses the first oscillating mass, and to which the first oscillating mass is coupled, and/or the second deflection element is a second frame, which encloses the second oscillating mass, and to which the second oscillating mass is coupled. In this way, it is advantageously possible to provide a compact three-axis yaw rate sensor, all oscillating masses of the sensor structures being driven with the aid of the same drive structure.

According to another preferred refinement, it is provided that the first frame and/or the second frame includes four angle elements, of which each of the angle elements has at least one first leg and one second leg and in each case one other adjacent angle element of the four angle elements is coupled to the first leg and to the second leg. By providing multiple angle elements, it is advantageously possible to deflect a drive movement of the drive structure along the second direction precisely into an oscillating movement of the first and/or second oscillating mass in another direction, in particular along the first oscillation direction, to suppress undesirable forms of movement (so-called interfering modes), in particular an in-phase movement of the partial oscillating masses, and at the same time to provide a yaw rate sensor having a compact structural form and three sensitive axes.

According to another preferred refinement, it is provided that the yaw rate sensor has a substrate having a main extension plane, the drive structure being situated movably in parallel to the main extension plane, in particular linearly, the first oscillation direction and the second oscillation direction being situated in parallel to the main extension plane, the first oscillating mass and the second oscillating mass being situated deflectably perpendicularly to the main extension plane, and the second oscillating mass being situated deflectably in parallel to the main extension plane. In this way it is advantageously possible to situate a first sensor structure for detecting a yaw rate around the first axis of rotation and the second sensor structure for detecting both the second yaw rate around the second axis of rotation and the third yaw rate around the third axis of rotation on a shared substrate adjacent to one another in the projection direction and to drive the two oscillating masses with the aid of the same drive structure into the drive oscillations.

According to another preferred refinement, it is provided that the first oscillating mass has a first partial oscillating mass and a further first partial oscillating mass, which is coupled to the first partial oscillating mass, and/or the second oscillating mass has a second partial oscillating mass and a further second partial oscillating mass, which is coupled to the second partial oscillating mass, the first partial oscillating mass and the further first partial oscillating mass being drivable into a first drive oscillation in phase opposition, the second partial oscillating mass and the further second partial oscillating mass being drivable into a second drive oscillation in phase opposition. In this way, it is advantageously possible to also ensure good maintenance of a second drive oscillation in phase opposition of the second partial oscillating mass and the further partial oscillating mass in phase opposition also in the case of a comparatively simply designed drive structure.

According to another preferred refinement, it is provided that the first sensor structure has a first electrode assembly, the second sensor structure having a second electrode assembly and a third electrode assembly, the first electrode assembly being configured for detecting a deflection of the first oscillating mass perpendicular to the main extension plane of the substrate and the second electrode assembly being configured for detecting a deflection of the second oscillating mass perpendicular to the main extension plane of the substrate, the third electrode assembly being configured for detecting a deflection of the second oscillating mass in parallel to the main extension plane. In this way, it is advantageously possible to house multiple electrode assemblies in a comparatively small sensor volume.

According to another preferred refinement, it is provided that the first electrode assembly has a first electrode surface extending in parallel to the main extension plane of the substrate and/or the second electrode assembly has a second electrode surface extending in parallel to the main extension plane of the substrate and/or the third electrode assembly has a plurality of web-shaped sub-electrodes, in particular the plurality of partial electrodes of the third electrode assembly being situated in a recess of the second oscillating mass. In this way, it is advantageously possible to situate flatly extending electrodes in a printed conductor plane which includes polycrystalline silicon, for example, of the substrate and thus save further construction space. Furthermore, the compactness of the yaw rate sensor is improved still further in that the third electrode assembly is situated in the recess of the oscillating mass. The electrode surfaces implement, in particular with the oscillating masses situated above them perpendicularly to the main extension direction, capacitor surfaces and may therefore detect movements perpendicular to the main extension plane of the substrate.

According to one preferred refinement of the method according to the present invention, it is provided that, in the third manufacturing step, the first oscillating mass is coupled via a first deflection element to the drive structure and/or the second oscillating mass is coupled via a second deflection element to the drive structure, in particular the first deflection element being implemented as a first frame enclosing the first oscillating mass and/or the second deflection element being implemented as a second frame enclosing the second oscillating mass, in particular the first oscillating mass being coupled to the first frame and/or the second oscillating mass being coupled to the second frame. In this way, it is advantageously possible to provide a compact yaw rate sensor, which has two oscillating masses drivable with the aid of the same drive structure and a sensitivity with respect to three different axes of rotation.

According to another preferred refinement of the method according to the present invention, it is provided that in the third manufacturing step, four angle elements, of which each of the angle elements has at least one first leg and one second leg, are coupled to one another to form the first frame and/or the second frame, each of the angle elements being coupled using the first leg and the second leg in each case to another adjacent angle element of the four angle elements. In this way, it is advantageously possible to drive a drive oscillation in phase opposition of two partial oscillating masses of the oscillating masses and to suppress an in-phase oscillating movement of the partial oscillating masses.

Exemplary embodiments of the present invention are illustrated in the drawings and explained in greater detail in the following description.

DETAILED DESCRIPTION OF THE INVENTION

Figure 1:
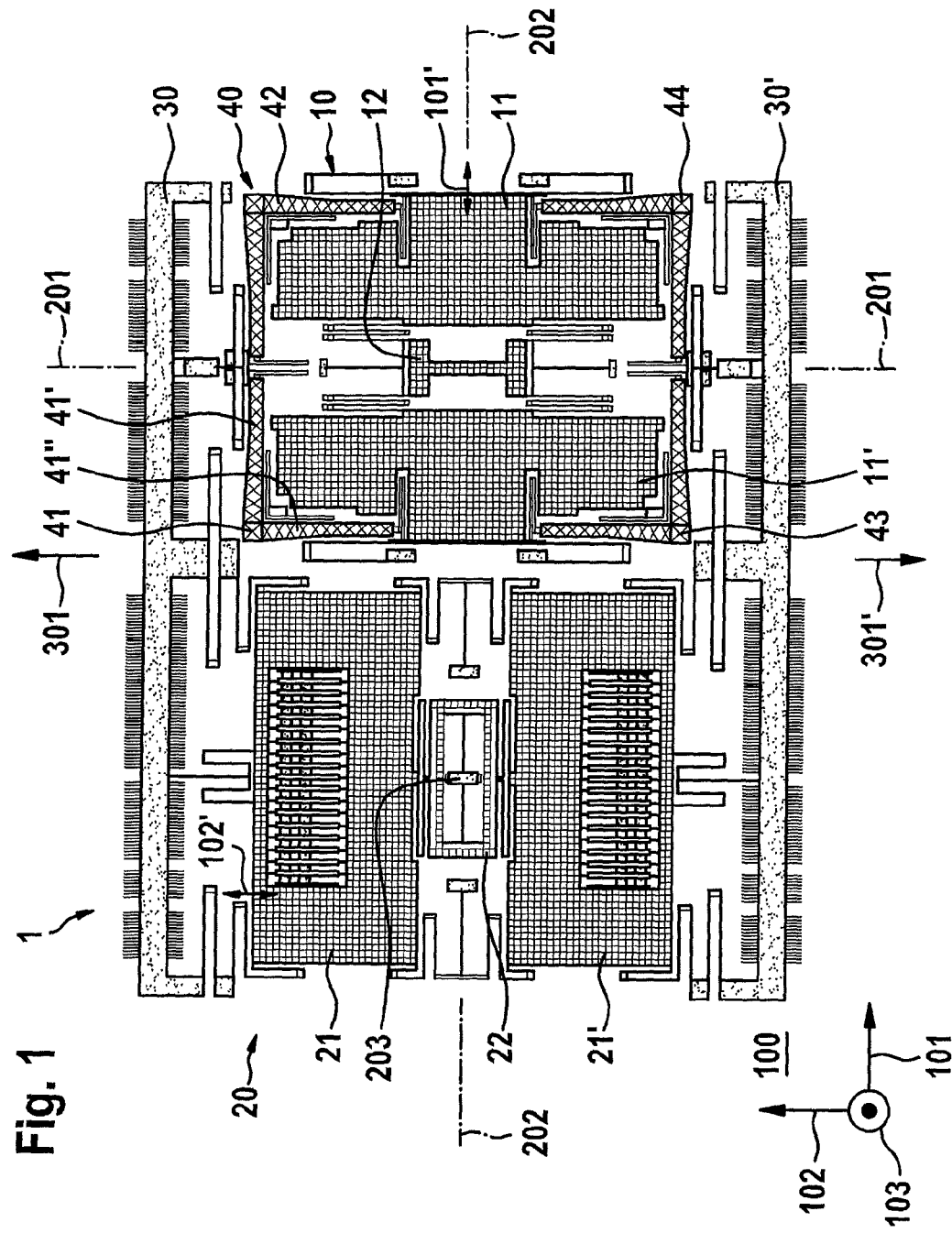
FIGS. 1 through 8 respectively show first through eighth example embodiments of a yaw rate sensor according to the present invention.

Identical parts are always provided with identical reference numerals in the various figures and therefore are generally also only cited or mentioned once in each case.

FIG. 1 shows a yaw rate sensor 1 according to one specific embodiment of the present invention. Yaw rate sensor 1 is configured here for detecting a yaw rate of a rotational movement around a first axis of rotation 201, around a second axis of rotation 202, and/or around a third axis of rotation 203. First axis of rotation 201 and second axis of rotation 202 are arranged orthogonally to one another here and each extends in parallel to a main extension plane 100 of a substrate of yaw rate sensor 1. Yaw rate sensor 1 furthermore has a first sensor structure 10 having a first oscillating mass 11, 11' and a second sensor structure 20 having a second oscillating mass 21, 21'.

First oscillating mass 11, 11' of first sensor structure 10 includes a first partial oscillating mass 11 and a further first partial oscillating mass 11' here, which are coupled to one another via a first coupling element 12. First coupling element 12 is designed here as a torsion element and/or a rocker structure. In particular, the coupling element is situated on the substrate pivotably around a first torsion axis (not shown), which is parallel to first axis of rotation 201, in such a way that first partial oscillating mass 11 and further first partial oscillating mass 11' are drivable into a first drive oscillation in phase opposition and at the same time an in-phase oscillating movement of partial oscillating masses 11, 11' is suppressed. Oscillating mass 11, 11' is situated here on the substrate deflectably along a first oscillation direction 101' in parallel to a first direction 101, which is referred to as X direction 101, into the first drive oscillation, first oscillation direction 101' extending in parallel to main extension plane 100 of the substrate.

To generate the first drive oscillation, first oscillating mass 11, 11' is coupled to a drive structure 30 and in particular to a further drive structure 30'. Drive structure 30 and/or further drive structure 30' are situated movably in parallel to main extension plane 100 of the substrate, in particular in parallel to first detection axis 201 and/or perpendicular to first oscillation direction 101' and/or in parallel to a second direction 102, which is referred to as Y direction 102. Drive structure 30 is moved here in phase opposition to further drive structure 30', which is shown in FIG. 1 by antiparallel arrows 301 and 301'. The movement of drive structures 30, 30' in parallel to Y direction 102 is also referred to as a drive movement here.

To convert the drive movement of drive structure 30, 30' in parallel to Y direction 102 into the first drive oscillation in parallel to X direction 101, first sensor structure 10 has a deflection means 40, in particular a frame 40 which encloses oscillating mass 11, 11', i.e., first partial oscillating mass 11 and further first partial oscillating mass 11'. Frame 40 includes four angle elements 41, 42, 43, 44 here, of which each angle element is situated on the substrate pivotably in each case around a pivot axis, the pivot axes each being situated in parallel to a third direction 103 referred to as Z direction 103, Z direction 103 extending perpendicularly to main extension plane 100. In particular, the four pivot axes are situated in a corner region of the planar partial oscillating masses, frame 40 being implemented as rectangular in a rest position in particular. Each angle element of the four angle elements 41, 42, 43, 44 is implemented identically in particular, angle elements 41, 42, 43, 44 in particular only being situated differently with respect to their orientation on the substrate. Each angle element 41, 42, 43, 44 has in particular a first leg 41' and a second leg 41", in particular the pivot axes of angle elements 41, 42, 43, 44 each being situated in a corner region of the two legs 41', 41" in which the two legs 41', 41" are connected to one another. In particular, first leg 41' is preferably situated perpendicularly to second leg 41". Deflection element 40 is coupled here both to drive structure 30 and/or further drive structure 30' and also to oscillating mass 11, 11' in such a way that a drive movement in phase opposition (see arrows 301, 301') of drive structure 30 and further drive structure 30', which extends in parallel to Y direction 102, is converted into the first drive oscillation (see arrow 101'), which extends in parallel to X direction 101, which is situated perpendicularly to Y direction 102. X direction 101 and Y direction 102 are situated here in parallel to main extension plane 100 of the substrate. Furthermore, in particular first oscillating mass 11, 11' is deflectable in parallel to Z direction 103. This means that by way of a rotational movement of yaw rate sensor 1 around first axis of rotation 201, a first deviation movement in phase opposition, which is induced by a first Coriolis force, of first partial oscillating mass 11 and/or further first partial oscillating mass 11' is caused in parallel to Z direction 103.

Yaw rate sensor 1 furthermore has second sensor structure 20, which has a second oscillating mass 21, 21', second oscillating mass 21, 21' including a second partial oscillating mass 21 and a further second partial oscillating mass 21', the two second partial oscillating masses 21, 21' being drivable in phase opposition to one another along a second drive direction 102', which is parallel to Y direction 102, into a second drive oscillation. Drive structure 30 and/or further drive structure 30' are coupled here both to first oscillating mass 11, 11' of first sensor structure 10 and to second oscillating mass 21, 21' of second sensor structure 20. Second oscillating mass 21, 21' is drivable here into a second drive oscillation along a second oscillation direction 102', which is different from first oscillation direction 101', second oscillation direction 102' being situated in particular perpendicularly to first oscillation direction 101'. In particular, first oscillation direction 101' and second oscillation direction 102' are situated in parallel to main extension plane 100 of the substrate. Second partial oscillating mass 21 is coupled here to further second partial oscillating mass 21' via a second coupling element 22. In particular, second coupling element 22 is situated pivotably in relation to the substrate around a coupling pivot axis 203, which extends perpendicularly to Z direction 103 to main extension plane 100 of the substrate, and is simultaneously pivotable around a torsion axis, which extends in parallel to X direction 101 and second axis of rotation 202. Coupling pivot axis 203 extends along third axis of rotation 203 here. Furthermore, in particular second oscillating mass 21, 21' is deflectable both in parallel to Z direction 103 and in parallel to the X direction. This means, that due to a rotational movement of yaw rate sensor 1 around second axis of rotation 202, a second deviating movement in phase opposition, which is induced by a second Coriolis force, of second partial oscillating mass 21 and/or further second partial oscillating mass 21' in parallel to Z direction 103 is caused and due to a rotational movement of yaw rate sensor 1 around third axis of rotation 203, a further second deviating movement in phase opposition, which is induced by a third Coriolis force, of the two partial oscillating masses 21, 21' in parallel to X direction 101 is caused.

Figure 2:
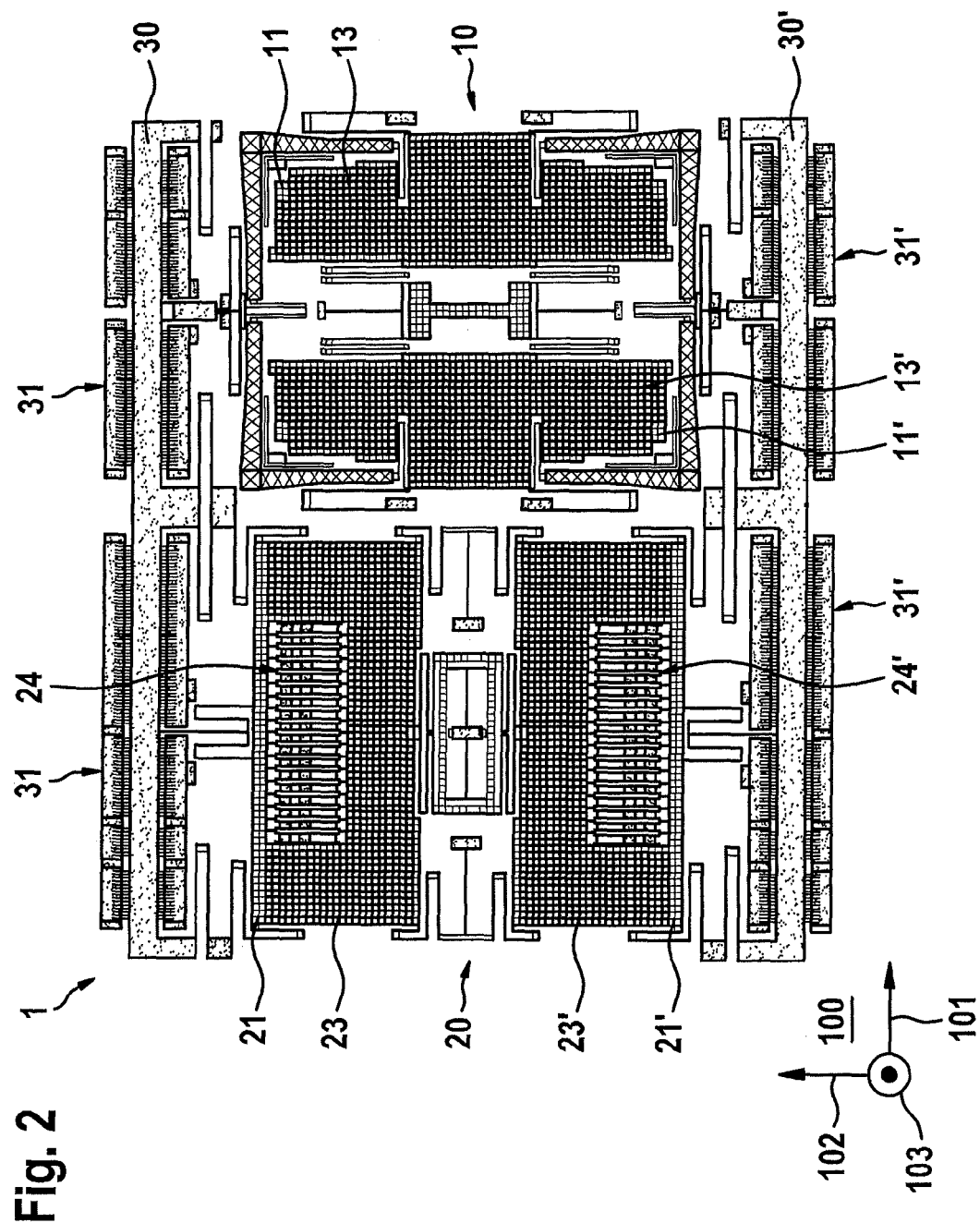

FIG. 2 shows a yaw rate sensor 1 according to another specific embodiment of the present invention, which essentially corresponds to the specific embodiment of yaw rate sensor 1 illustrated and described in FIG. 1. Yaw rate sensor 1 has here a drive element 31 situated on the substrate to generate the drive movement of drive structure 30 and/or a further drive element 31' to generate the drive movement of further drive structure 30'. In particular, drive elements 31, 31' are implemented as comb structures. Furthermore, yaw rate sensor 1 has a first electrode assembly 13, 13' and a second electrode assembly 23, 23', in particular first electrode assembly 13, 13' being configured for detecting a first capacitance change in conjunction with the first Coriolis force acting on first oscillating mass 11, 11' in parallel to the Z direction and/or in particular second electrode assembly 23, 23' being configured for detecting a second capacitance change in conjunction with the second Coriolis force acting on second oscillating mass 21, 21' in parallel to the Z direction. Furthermore, yaw rate sensor 1 has a third electrode assembly 24, 24', which is configured for detecting a third capacitance change in conjunction with the third Coriolis force acting on second oscillating mass 21, 21' in parallel to X direction 101. In particular, each partial oscillating mass 11, 11', 21, 21' of oscillating masses 11, 11', 21, 21' is each uniquely associated with a separate sub-electrode assembly 13, 13', 21, 21', 24, 24', as shown in FIG. 2.

Figure 3:
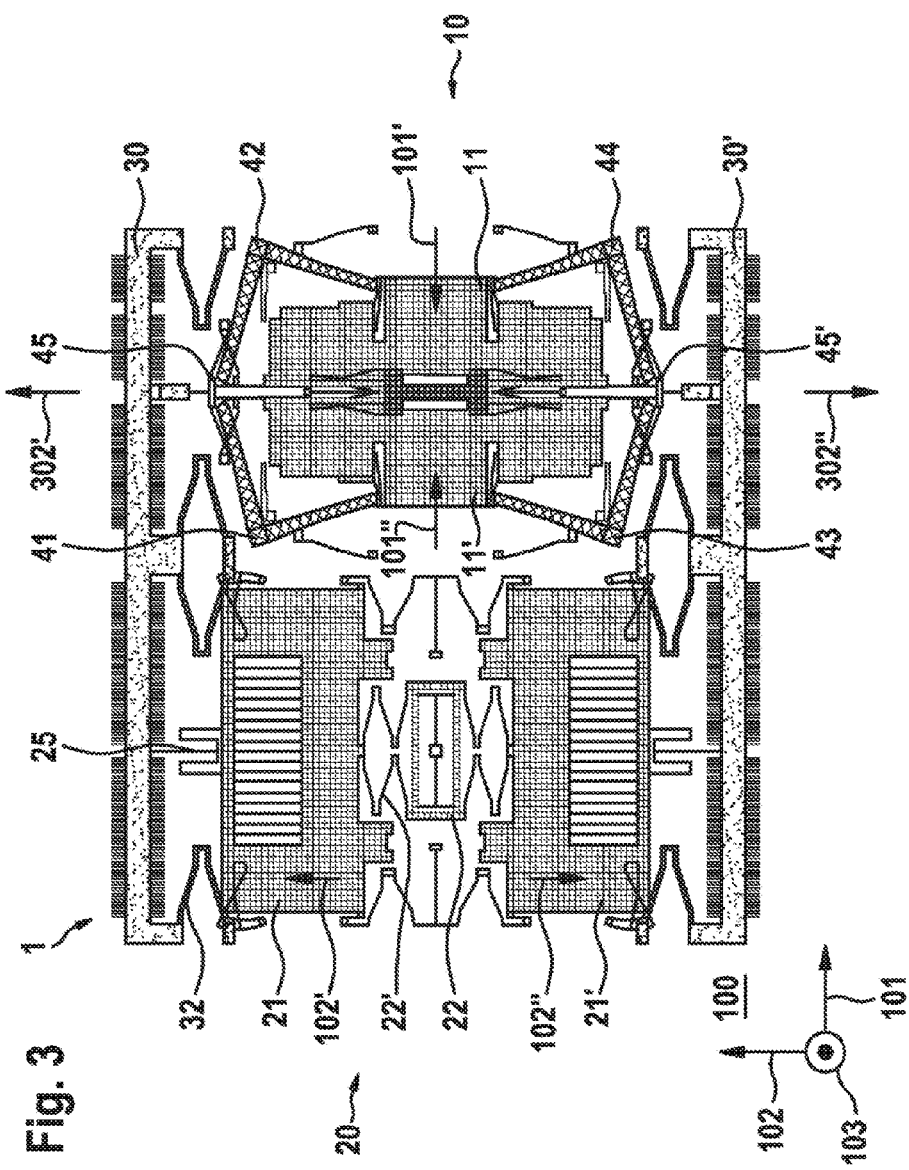

FIG. 3 shows a yaw rate sensor 1 according to another specific embodiment of the present invention, which essentially corresponds to the above-described specific embodiments of yaw rate sensor 1. Yaw rate sensor 1 is shown here during a drive movement in phase opposition of drive structures 30, 30', which is shown by antiparallel arrows 302', 302". Drive structure 30 is coupled here via a main-spring 32 to the substrate and is situated movably in relation to the substrate. Due to the coupling of drive structure 30 at a first coupling point 45 of deflection element 40, a movement of drive structure 30 in the direction of arrow 302' is converted into a pivot movement of the two angle elements 41, 42, so that the ends of the legs of angle elements 41, 42 opposite to coupling point 45 carry out an antiparallel movement in the directions shown by antiparallel arrows 101', 101". In this way, a first drive mode in phase opposition of the two first partial oscillating masses 11, 11' in parallel to X direction 101 is initiated. Angle elements 43, 44 are situated mirror-symmetrically with respect to second axis of rotation 202 and are coupled to further drive structure 30' via a further coupling point 45'. Second oscillating mass 21, 21' of second sensor structure 20 is driven by the drive movement in phase opposition (see arrows 302', 302") into the second drive mode in phase opposition (see antiparallel arrows 102', 102"). In this case, the two second partial oscillating masses 21, 21' are coupled via coupling springs 22' to second coupling element 22.

Figure 4:
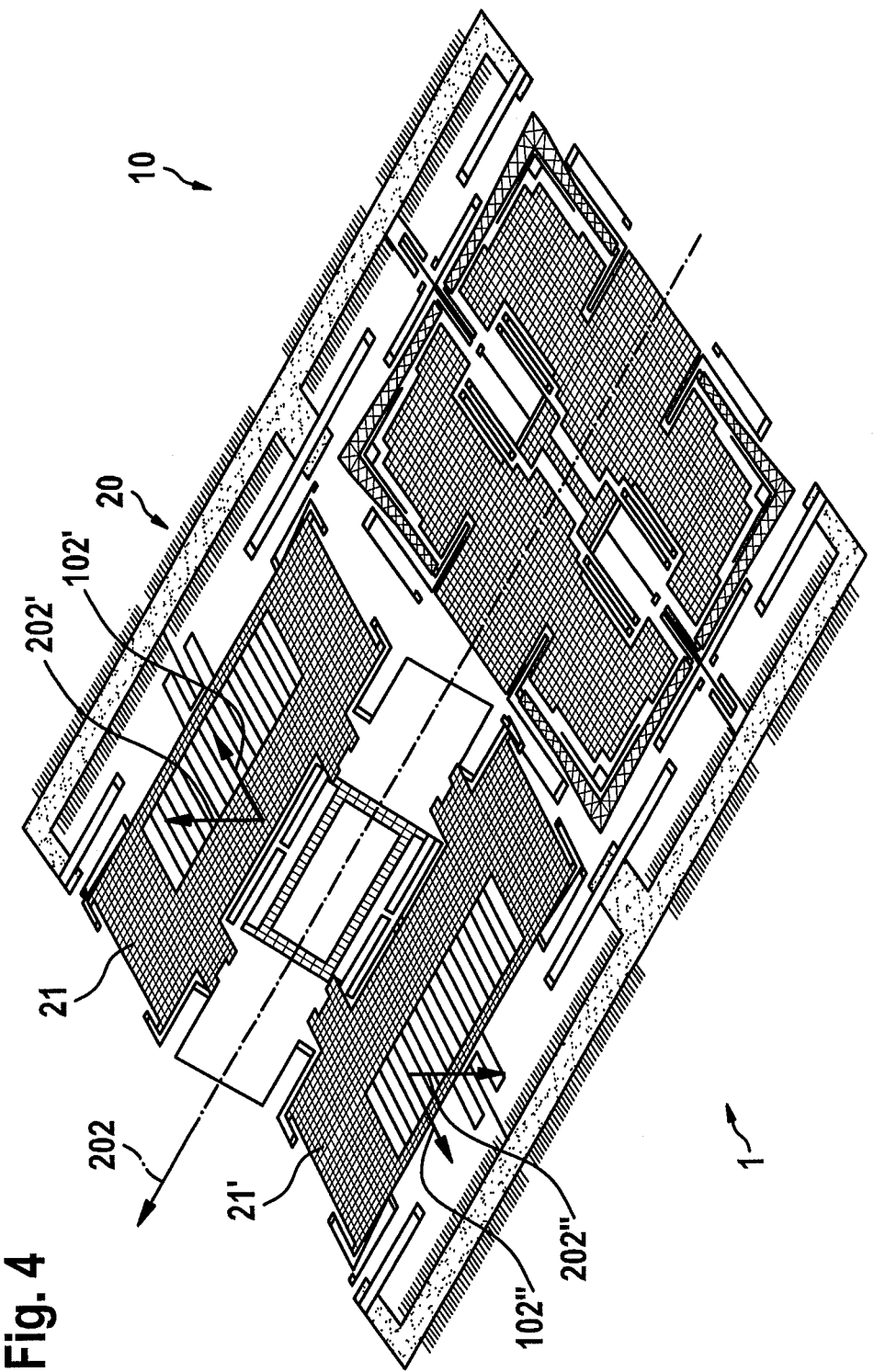

FIG. 4 shows a yaw rate sensor 1 according to another specific embodiment of the present invention, which essentially corresponds to the above-described specific embodiments of yaw rate sensor 1. The second deviation movement of the two second partial oscillating masses 21, 21' induced due to the second Coriolis force by a rotational movement of yaw rate sensor 1 around second axis of rotation 202 is shown here. Due to the second drive oscillation in phase opposition of second oscillating mass 21, 21'—shown here by antiparallel arrows 102', 102"—during a rotational movement of yaw rate sensor 1 around second axis of rotation 202, second partial oscillating mass 21 is deflected in parallel to Z direction 102 (see arrow 202') and further second partial oscillating mass 21' is deflected in an opposite direction (see arrow 202").

Figure 5:
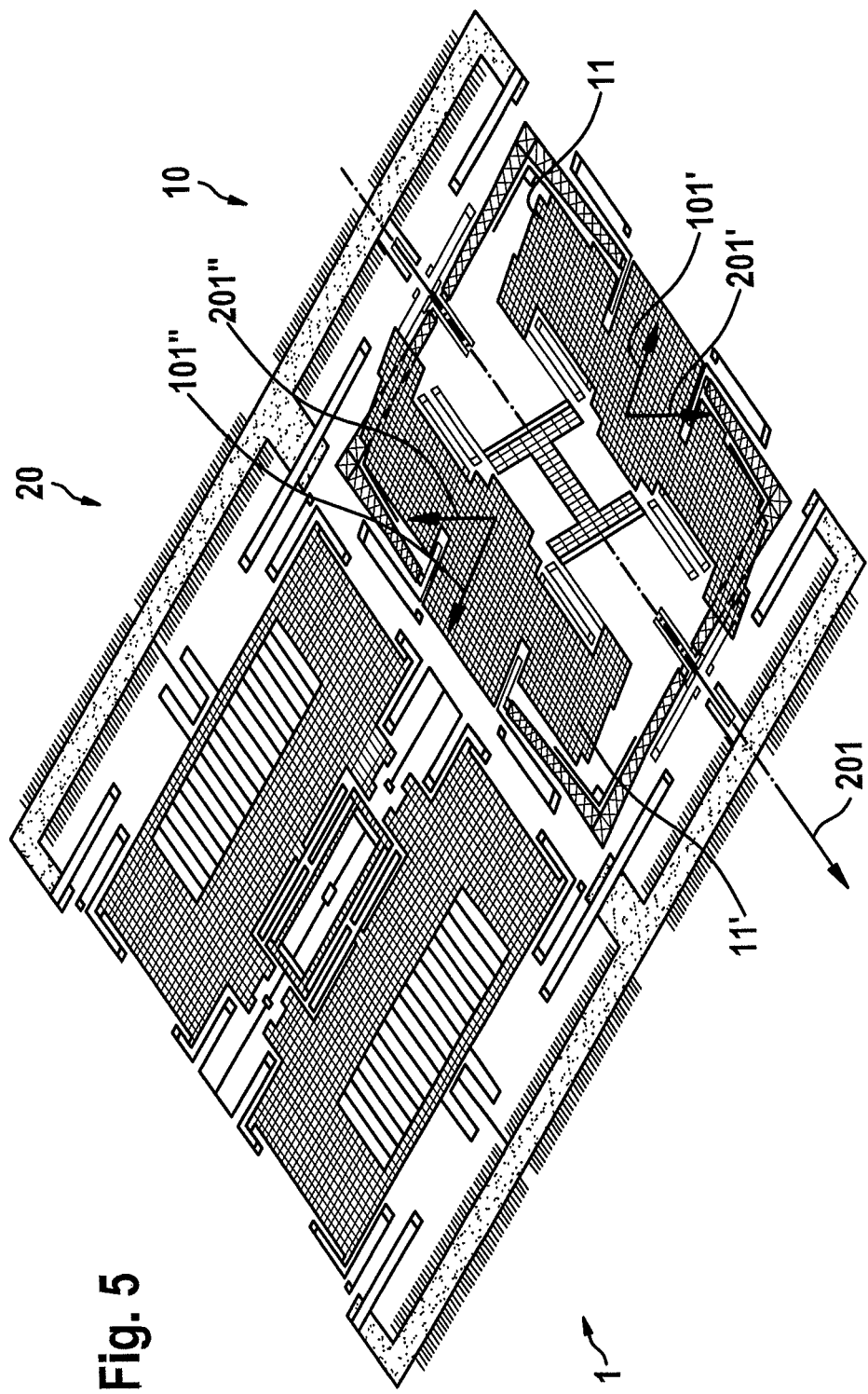

FIG. 5 shows a yaw rate sensor 1 according to another specific embodiment of the present invention, which essentially corresponds to the above-described specific embodiments of yaw rate sensor 1. The first deviation movement of the two first partial oscillating masses 11, 11' due to the first Coriolis force induced by a rotational movement of yaw rate sensor 1 around first axis of rotation 201 is shown here. Due to the first drive oscillation in phase opposition of first oscillating mass 11, 11'—shown here by antiparallel arrows 101', 101"—during a rotational movement of yaw rate sensor 1 around first axis of rotation 201, first partial oscillating mass 11 is deflected in parallel to Z direction 102 (see arrow 201') and further first partial oscillating mass 11' is deflected in an opposite direction (see arrow 201").

Figure 6:
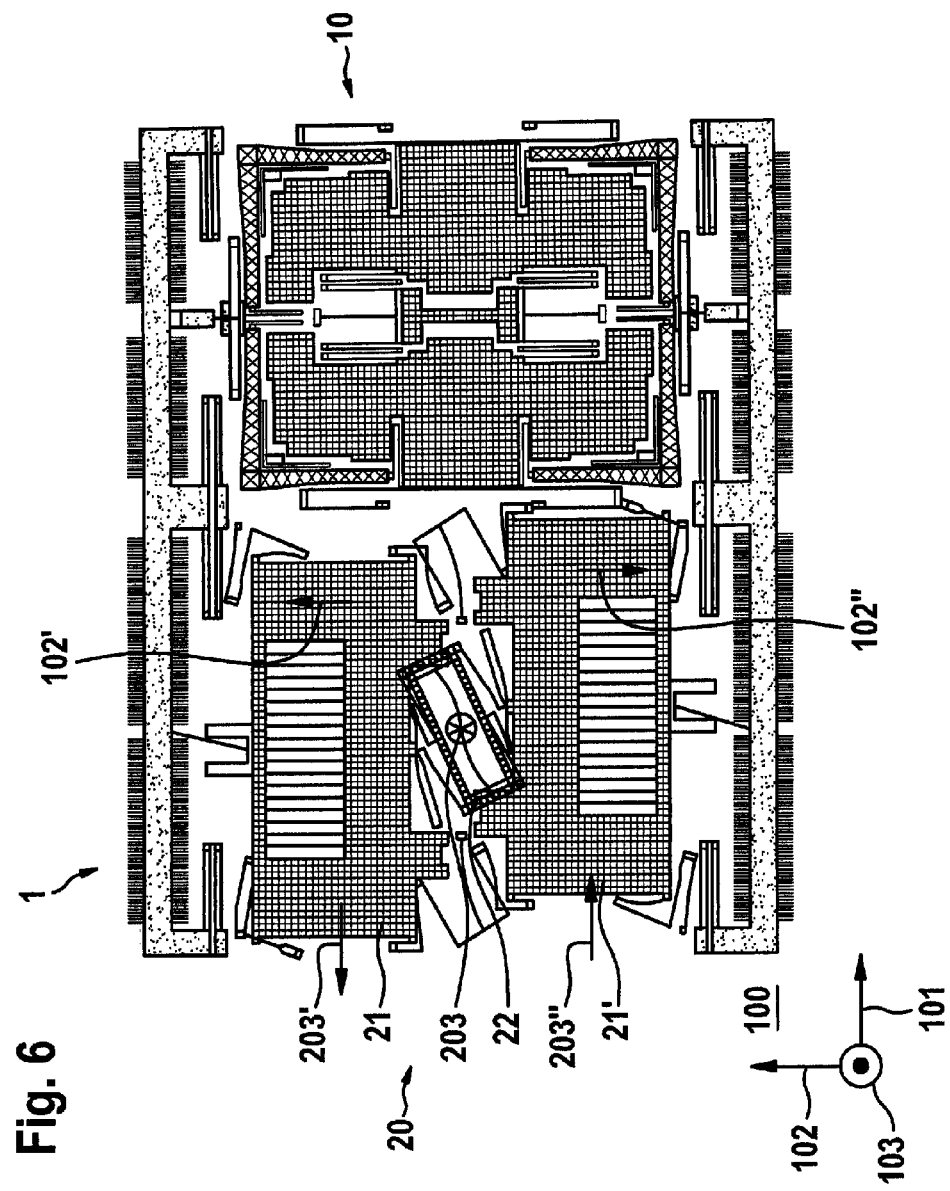

FIG. 6 shows a yaw rate sensor 1 according to another specific embodiment of the present invention, which essentially corresponds to the above-described specific embodiments of yaw rate sensor 1. The further second deviation movement of the two second partial oscillating masses 21, 21' due to the third Coriolis force induced by a rotational movement of yaw rate sensor 1 around third axis of rotation 203 is shown here. Due to the second drive oscillation in phase opposition of second partial oscillating mass 21, 21'—shown here by antiparallel arrows 102', 102"—during a rotational movement of yaw rate sensor 1 around third axis of rotation 203, second partial oscillating mass 21 is deflected in parallel to X straight line 101 (see arrow 203') and further second partial oscillating mass 21' is deflected in an opposite direction (see arrow 203"). During the further second deviation movement, second coupling element 22 is pivoted around third axis of rotation 203.

Figure 7:
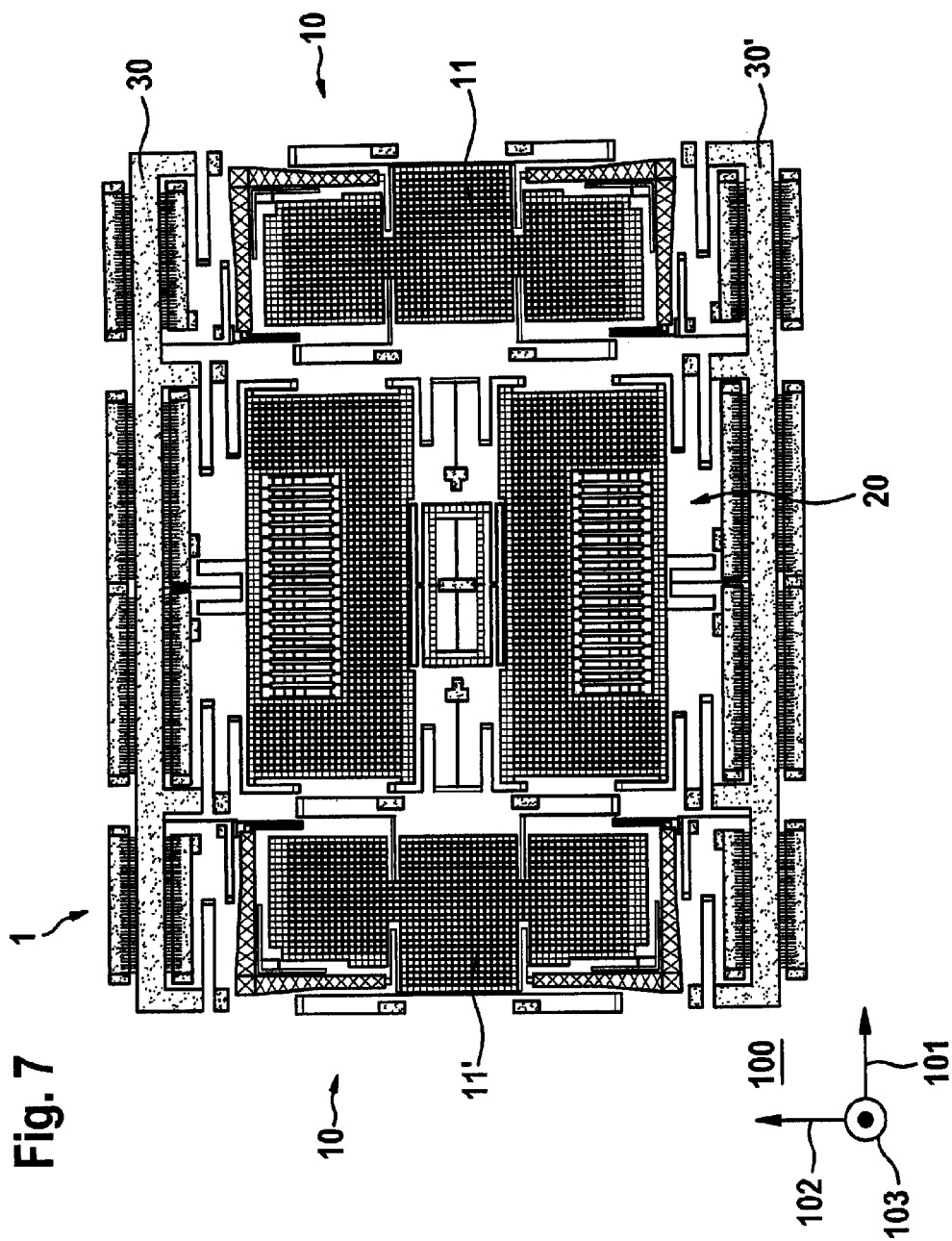

FIG. 7 shows a yaw rate sensor 1 according to another specific embodiment of the present invention, which essentially corresponds to the above-described specific embodiments of yaw rate sensor 1. Second sensor structure 20 is situated here between first partial oscillating mass 11 and further first partial oscillating mass 11' of first sensor structure 10. For example, in the case of yaw rate sensors implemented asymmetrically with respect to one or more axes, manufacturing-related variations in the structure widths of springs and mass webs may result in a change of the oscillation modes or drive modes and/or detection modes. For example, a slightly inclined oscillation of the drive frame elements may result from a plane-parallel drive movement of the drive structure or drive frame elements in the case of non-nominal structure widths, during which, for example, one side of a drive frame element has a first oscillation amplitude, which is greater or less than an oscillation amplitude of another drive frame element, which is in particular situated on an opposite side. Therefore, for example, an amplitude of the first drive oscillation of the first oscillating mass may deviate from an amplitude of the second drive oscillation of the second oscillating mass and may result in differences in the signal sensitivity or in interfering signals, for example, also known under the term quadrature.

The specific embodiment shown in FIG. 7, in contrast, has an increased symmetry in relation to the above-described specific embodiments. First partial oscillating mass 11 and further first partial oscillating mass 11' of first sensor structure 10 are situated spatially separated from centrally situated second sensor structure 20 here. As in the above-described specific embodiments, the first drive oscillation—i.e., a first partial drive oscillation of first partial oscillating mass 11 and a further first partial drive oscillation of further first partial oscillating mass 11'—are driven by drive structure 30 and/or further drive structure 30', the conversion of the drive movement along Y direction 102 occurring via deflection frame 40—which includes correspondingly situated sub-frames—into the first drive oscillation in parallel to X direction 101. Due to the spatial separation of the two partial oscillating masses, in contrast to the specific embodiments described in FIGS. 1 through 6, the direct spring coupling with the aid of first coupling element 12 (see FIG. 1) is absent here. Therefore, due to manufacturing-related scattering, the resonant frequencies of the normal modes of the two first partial oscillating masses 11, 11' may slightly differ from one another and signals having differing sensitivity may be provided.

Figure 8:
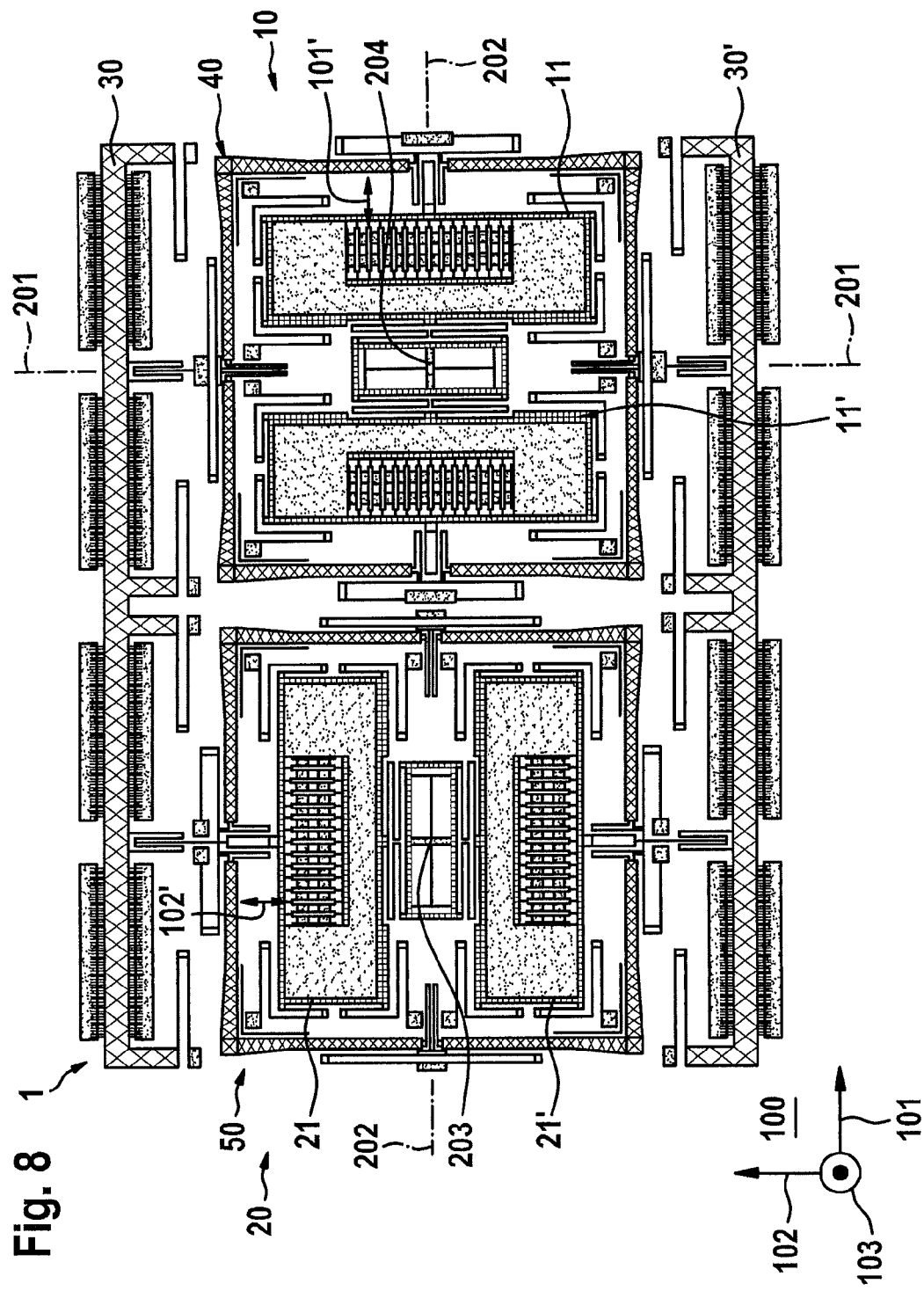

FIG. 8 shows a yaw rate sensor 1 according to another specific embodiment of the present invention, which essentially corresponds to the above-described specific embodiments of yaw rate sensor 1. Second sensor structure 20 is designed identically to first sensor structure 10 here, the first sensor structure being configured for detecting the first yaw rate around first axis of rotation 201, the second sensor structure being configured for detecting the second yaw rate around second axis of rotation 202, the second sensor structure being configured for detecting the third yaw rate around the third axis of rotation, and additionally the first sensor structure being configured for detecting a fourth yaw rate around a fourth axis of rotation 204. Fourth axis of rotation 204 is situated here in parallel to third axis of rotation 203, in particular situated perpendicularly to main extension plane 100. Furthermore, the first sensor structure has first frame 40 and second sensor structure 20 has a second frame 50, first frame 40 and second frame 50 being implemented identically, only the arrangement and/or coupling of oscillating masses 11, 11' and 21, 21' differing in relation to first frame 40 or second frame 50, respectively.

The drive movement of drive structure 30 and/or further drive structure 30' in parallel to Y direction 102 is coupled here without deflection into the second drive oscillation of second oscillating mass 21, 21'. The drive movement of drive structure 30 and/or the further drive structure is converted by deflection frame 40 into the first drive oscillation of the first oscillating mass along first oscillation direction 101' in parallel to the X direction. The detection signals related to the particular detected yaw rate in parallel to the Z direction by the sensor structures are interconnected here already in a chip of yaw rate sensor 1, in such a way that, as for the yaw rate signals which are related to the first yaw rate around first axis of rotation 201 and the second yaw rate around second axis of rotation 202, only two yaw rate signals are also provided here to an electrical analysis circuit of the yaw rate sensor.

What is claimed is:

1. A yaw rate sensor for detecting a rotational movement, comprising:
a first sensor structure having a first oscillating mass coupled via a first deflection element to a drive structure, and configured to detect a first yaw rate around a first axis of rotation;
a second sensor structure having a second oscillating mass coupled to the drive structure, and configured to detect a second yaw rate around a second axis of rotation and a third yaw rate around a third axis of rotation different from the second axis of rotation; and
the drive structure coupled to the first and second oscillating masses and configured to provide a drive motion in a drive direction;
wherein the first oscillating mass is drivable into a first drive oscillation along a first oscillation direction, the second oscillating mass is drivable into a second drive oscillation along a second oscillation direction different from the first oscillation direction, the first axis of rotation is perpendicular to the first oscillation direction, and the second and third axes of rotation are perpendicular to the second oscillation direction, and
the first deflection element includes four pivot elements, each configured to pivot to produce the first drive oscillation along the first oscillation direction of the first oscillating mass in response to the drive motion in the drive direction of the drive structure, the drive direction being perpendicular to the first oscillation direction.

2. The yaw rate sensor as recited in claim 1, wherein the first deflection element is configured in such a way that the first oscillation direction is situated perpendicularly to the second oscillation direction.

3. The yaw rate sensor as recited in claim 1, further comprising:
a substrate having a main extension plane, wherein the drive structure is situated movably in parallel to the main extension plane, the first oscillation direction and the second oscillation direction being situated in parallel to the main extension plane, the first oscillating mass and the second oscillating mass being situated deflectably perpendicularly to the main extension plane, and wherein the second oscillating mass is situated deflectably in parallel to the main extension plane.

4. The yaw rate sensor as recited in claim 1, wherein the first oscillating mass has a first partial oscillating mass and a first further partial oscillating mass coupled to the first partial oscillating mass, the first partial oscillating mass and the first further partial oscillating mass being drivable in phase opposition to each other.

5. The yaw rate sensor as recited in claim 1, wherein:
the first sensor structure has a first electrode assembly, the first electrode assembly being configured for detecting a deflection of the first oscillating mass perpendicular to a main extension plane of the substrate; and
the second sensor structure has a second electrode assembly and a third electrode assembly, the second electrode assembly being configured for detecting a deflection of the second oscillating mass perpendicular to the main extension plane of the substrate, and the third electrode assembly being configured for detecting a deflection of the second oscillating mass in parallel to the main extension plane.

6. The yaw rate sensor as recited in claim 5, wherein at least one of: (i) the first electrode assembly has a first electrode surface extending in parallel to the main extension plane of the substrate, (ii) the second electrode assembly has a second electrode surface extending in parallel to the main extension plane of the substrate, or (iii) the third electrode assembly has a plurality of web-shaped sub-electrodes situated in a recess of the second oscillating mass.

7. The yaw rate sensor as recited in claim 1, wherein the second oscillating mass has a second partial oscillating mass and a second further partial oscillating mass coupled to the second partial oscillating mass, the second partial oscillating mass and the second further second partial oscillating mass being drivable in phase opposition to each other.

8. A yaw rate sensor for detecting a rotational movement, comprising:
a first sensor structure having a first oscillating mass coupled to a drive structure, and configured to detect a first yaw rate around a first axis of rotation;
a second sensor structure having a second oscillating mass coupled to the drive structure, and configured to detect a second yaw rate around a second axis of rotation and a third yaw rate around a third axis of rotation different from the second axis of rotation; and
the drive structure coupled to the first and second oscillating masses;
wherein the first oscillating mass is drivable into a first drive oscillation along a first oscillation direction, the second oscillating mass is drivable into a second drive oscillation along a second oscillation direction different from the first oscillation direction, the first axis of rotation is perpendicular to the first oscillation direction, and the second and third axes of rotation are perpendicular to the second oscillation direction, and
at least one of: (i) the first oscillating mass is coupled to the drive structure via a first deflection element, the first deflection element including a first frame enclosing the first oscillating mass, to which the first oscillating mass is coupled, or (ii) the second oscillating mass is coupled to the drive structure via a second deflection element, the second deflection element including a second frame enclosing the second oscillating mass, to which the second oscillating mass is coupled.

9. The yaw rate sensor as recited in claim 8, wherein at least one of: the first oscillating mass has a partial oscillating mass and a further partial oscillating mass coupled to the partial oscillating mass, or the second oscillating mass has the partial oscillating mass and the further partial oscillating mass coupled to the partial oscillating mass;
the partial oscillating mass and the further partial oscillating mass being drivable in phase opposition to each other.

10. A yaw rate sensor for detecting a rotational movement, comprising:
a first sensor structure having a first oscillating mass coupled to a drive structure, and configured to detect a first yaw rate around a first axis of rotation;
a second sensor structure having a second oscillating mass coupled to the drive structure, and configured to detect a second yaw rate around a second axis of rotation and a third yaw rate around a third axis of rotation different from the second axis of rotation; and
the drive structure coupled to the first and second oscillating masses;

wherein the first oscillating mass is drivable into a first drive oscillation along a first oscillation direction, the second oscillating mass is drivable into a second drive oscillation along a second oscillation direction different from the first oscillation direction, the first axis of rotation is perpendicular to the first oscillation direction, and the second and third axes of rotation are perpendicular to the second oscillation direction;

at least one of: (i) the first oscillating mass is coupled to the drive structure via a first deflection element, the first deflection element including four angle elements, or (ii) the second oscillating mass is coupled to the drive structure via a second deflection element, the second deflection element including the four angle elements; and each of the angle elements has a first leg and a second leg, and for each of the first leg and the second leg of a respective angle element, another adjacent angle element is coupled thereto.

11. The yaw rate sensor as recited in claim 10, wherein at least one of: the first oscillating mass has a partial oscillating mass and a further partial oscillating mass coupled to the partial oscillating mass, or (ii) the second oscillating mass has the partial oscillating mass and the further partial oscillating mass coupled to the partial oscillating mass;

the partial oscillating mass and the further partial oscillating mass being drivable in phase opposition to each other.

12. A method for manufacturing a yaw rate sensor, comprising:

providing, on a substrate having a main extension plane, a first sensor structure having a first oscillating mass, a second sensor structure having a second oscillating mass, and a drive structure movable in parallel to the main extension plane;

configuring the first oscillating mass to be drivable into a first drive oscillation along a first oscillation direction, and configuring the second oscillating mass to be drivable into a second drive oscillation along a second oscillation direction different from the first oscillation direction;

coupling the drive structure to the first oscillating mass and to the second oscillating mass, the drive structure coupled to the first oscillating mass via a first deflection element, the drive structure configured to provide a drive motion in a drive direction; and configuring the first sensor structure for detecting a first yaw rate around a first axis of rotation, the second sensor structure for detecting a second yaw rate around a second axis of rotation and a third yaw rate around a third axis of rotation different from the second axis of rotation, the first axis of rotation being situated perpendicularly to the first oscillation direction, the second axis of rotation being situated perpendicularly to the second oscillation direction, and the third axis of rotation being perpendicular to the second oscillation direction, wherein the first deflection element includes four pivot elements, each configured to pivot to produce the first drive oscillation along the first oscillation direction of the first oscillating mass in response to the drive motion in the drive direction of the drive structure, the drive direction being perpendicular to the first oscillation direction.

13. The method as recited in claim 12, wherein at least one of: (i) the first deflection element is implemented as a first frame which is coupled to the first oscillating mass, or (ii) the drive structure is coupled to the second oscillating mass via a second deflection element, the second deflection element implemented as a second frame which is coupled to the second oscillating mass.

14. The method as recited in claim 12, wherein:
each of the pivot elements includes an angle element;
each of the angle elements has a first leg and a second leg; and
for each of the first leg and the second leg of a respective angle element, another adjacent angle element is coupled thereto.

15. A sensor, comprising:
a first sensor structure having a first oscillating mass coupled via a first deflection element to a drive structure, the first oscillating mass being drivable into a first drive oscillation along a first oscillation direction;
a second sensor structure having a second oscillating mass coupled to the drive structure, the second oscillating mass being drivable into a second drive oscillation along a second oscillation direction substantially perpendicular to the first oscillation direction; and
the drive structure coupled to the first and second oscillating masses and configured to provide a drive motion in a drive direction,
wherein the first deflection element includes four pivot elements, each configured to pivot to produce the first drive oscillation along the first oscillation direction of the first oscillating mass in response to the drive motion of the drive structure in the drive direction, the drive direction being substantially perpendicular to the first oscillation direction.

16. The sensor as recited in claim 15, wherein the first sensor structure is configured to detect a first yaw rate around a first axis of rotation, and the second sensor structure is configured to detect a second yaw rate around a second axis of rotation substantially perpendicular to the first axis of rotation.

17. The sensor as recited in claim 16, wherein the second sensor structure is configured to detect a third yaw rate around a third axis of rotation substantially perpendicular to the first axis of rotation and the second axis of rotation.

18. The sensor as recited in claim 17, wherein the first axis of rotation is substantially perpendicular to the first oscillation direction, the second axis of rotation is substantially perpendicular to the second oscillation direction, and the third axis of rotation is substantially perpendicular to the second oscillation direction.

19. The sensor as recited in claim 15, wherein the first deflection element is a first frame enclosing the first oscillating mass.

20. The sensor as recited in claim 15, wherein each of the pivot elements includes an angle element, each of the angle elements having a first leg and a second leg.

21. The sensor as recited in claim 20, wherein for each of the first leg and the second leg of a respective angle element, another adjacent angle element is coupled thereto.

22. The sensor as recited in claim 15, wherein at least one of the first oscillating mass and the second oscillating mass has a partial oscillating mass and a further partial oscillating mass coupled to the partial oscillating mass, the partial oscillating mass and the further partial oscillating mass being drivable in phase opposition to each other.

* * * * *